(12) United States Patent
Igarashi

(10) Patent No.: US 8,351,058 B2
(45) Date of Patent: Jan. 8, 2013

(54) PRINTING APPARATUS INCLUDING RESTRICTION PROCESSING, PRINTING METHOD, RECORDING MEDIUM STORING PRINTING PROGRAM

(75) Inventor: Osamu Igarashi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1231 days.

(21) Appl. No.: 11/854,599

(22) Filed: Sep. 13, 2007

(65) Prior Publication Data

US 2008/0137134 A1 Jun. 12, 2008

(30) Foreign Application Priority Data

Dec. 11, 2006 (JP) ................................ 2006-333265

(51) Int. Cl.
*G06K 15/00* (2006.01)

(52) U.S. Cl. ...................... 358/1.14; 358/1.13; 358/1.15

(58) Field of Classification Search ................ 358/1.13, 358/1.14, 1.15
See application file for complete search history.

(56) References Cited

U.S. PATENT DOCUMENTS

| 2002/0018230 A1* | 2/2002 | Iwadate ........................ 358/1.14 |
| 2005/0275868 A1* | 12/2005 | Higashiura et al. .......... 358/1.14 |
| 2007/0083679 A1* | 4/2007 | Kikuchi ............................ 710/8 |

FOREIGN PATENT DOCUMENTS

| JP | 08-036470 A | 2/1996 |
| JP | 11203081 A * | 7/1999 |

* cited by examiner

Primary Examiner — Jacky X Zheng
(74) Attorney, Agent, or Firm — Sughrue Mion, PLLC

(57) ABSTRACT

A printing apparatus, including: an identification information storing section that stores identification information for other printing apparatus; a restriction information storing section that groups the stored identification information, and stores restriction information that gives a restriction for using a function provided by a printing apparatus belonging to the same group; an information sharing section that mutually shares the stored identification information stored and the stored restriction information with printing apparatuses in the same group; an information controller that, upon update of the stored restriction information, controls to send the restriction information to other printing apparatus in the same group, based on the identification information mutually shared by the information sharing section; and a usage restriction section that restricts use of the function, based on the restriction information sent from the information controller to other printing apparatus.

5 Claims, 17 Drawing Sheets

| TERMINAL NAME | NETWORK ADDRESS (MAC ADDRESS) |
|---|---|
| PRINTER 2-1 | XX:XX:XX:XX:XX:0a |
| PRINTER 2-2 | XX:XX:XX:XX:XX:0b |

USER REGISTRATION TABLE

| USER ID | USER A | USER B | USER C |
|---|---|---|---|
| RESTRICTION INFORMATION (UPPER LIMIT VALUE OF NUMBER OF PRINTING SHEETS) | 50 | 150 | 100 |
| USER INFORMATION (CURRENT VALUE OF NUMBER OF PRINTING SHEETS) | 40 | 130 | 90 |

(UNIT: SHEETS)

FIG.5

FULL COLOR  GRAY  RED

FULL COLOR  RED  GRAY

FULL COLOR

FULL COLOR

USER REGISTRATION TABLE

| USER ID | USER A | USER B | USER C |
|---|---|---|---|
| RESTRICTION INFORMATION (UPPER LIMIT VALUE OF NUMBER OF PRINTING SHEETS) | 50 | 150 | 100 |
| USER INFORMATION (CURRENT VALUE OF NUMBER OF PRINTING SHEETS) | 45 | 120 | 80 |
| USER HISTORY | 50 | 130 | 90 |
| TOTAL RESTRICTION VALUE | 300 |||

(UNIT: SHEETS)

FIG.13

PRINTING APPARATUS INCLUDING RESTRICTION PROCESSING, PRINTING METHOD, RECORDING MEDIUM STORING PRINTING PROGRAM

CROSS-REFERENCE TO RELATED APPLICATION

This application is based on and claims priority under 35 USC 119 from Japanese Patent Application No. 2006-333265 filed on Dec. 11, 2006.

BACKGROUND

Technical Field

The present invention relates to a printing apparatus, a printing method, a recording medium storing printing program, and a data signal embodied in a carrier wave.

SUMMARY

An aspect of the present invention provides a printing apparatus, which includes: an identification information storing section that stores identification information for other printing apparatus; a restriction information storing section that groups the identification information stored in the identification information storing section, and stores restriction information that gives a restriction for using a function provided by a printing apparatus belonging to the same group; an information sharing section that mutually shares the identification information stored in the identification information storing section and the restriction information stored in the restriction information storing section with printing apparatuses in the same group; an information controller that, upon update of the restriction information stored in the restriction information section, controls to send the restriction information to other printing apparatus in the same group, based on the identification information mutually shared by the information sharing section; and a usage restriction section that restricts use of the function, based on the restriction information sent from the information controller to other printing apparatus.

BRIEF DESCRIPTION OF THE DRAWINGS

Exemplary embodiments of the present invention will be described in detail based on the following figures, wherein:

FIG. 5 is an explanatory drawing for a user registration table in the first example of the present invention;

FIG. 13 is an explanatory drawing for a user registration table in a second example of the present invention;

DETAILED DESCRIPTION

Hereinbelow, exemplary embodiments of the present invention will be described.

FIRST EXAMPLE (Hardware Configuration, and the Like)

Figure 1:
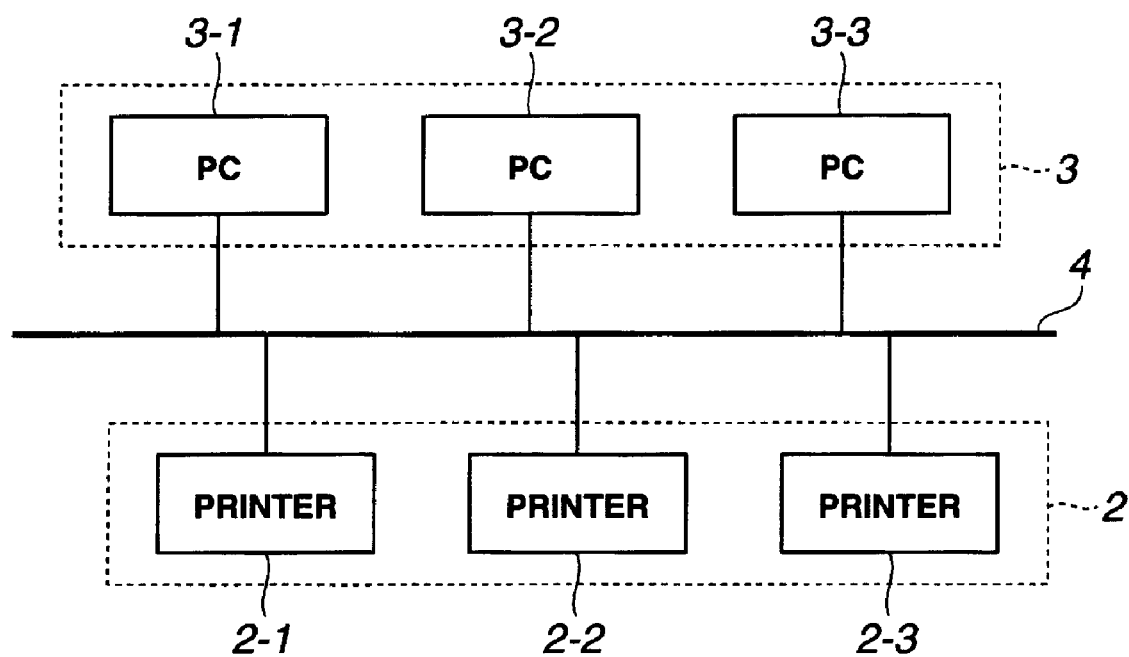
FIG. 1 is a block diagram illustrating the outline configuration of a network system pertaining to a first example of the present invention.

FIG. 1 is a block diagram illustrating the outline configuration of a network system 1 of the First Example. This network system 1 has a configuration in which a printer 2-1, printer 2-2, printer 2-3 (hereinafter collectively referred to as a "printer 2"), and a personal computer (hereinafter referred to as a "PC"), which serves as a host computer, 3-1, PC 3-2, PC 3-3 (hereinafter collectively referred to as a "PC 3") are connected to a LAN 4.

Figure 2:
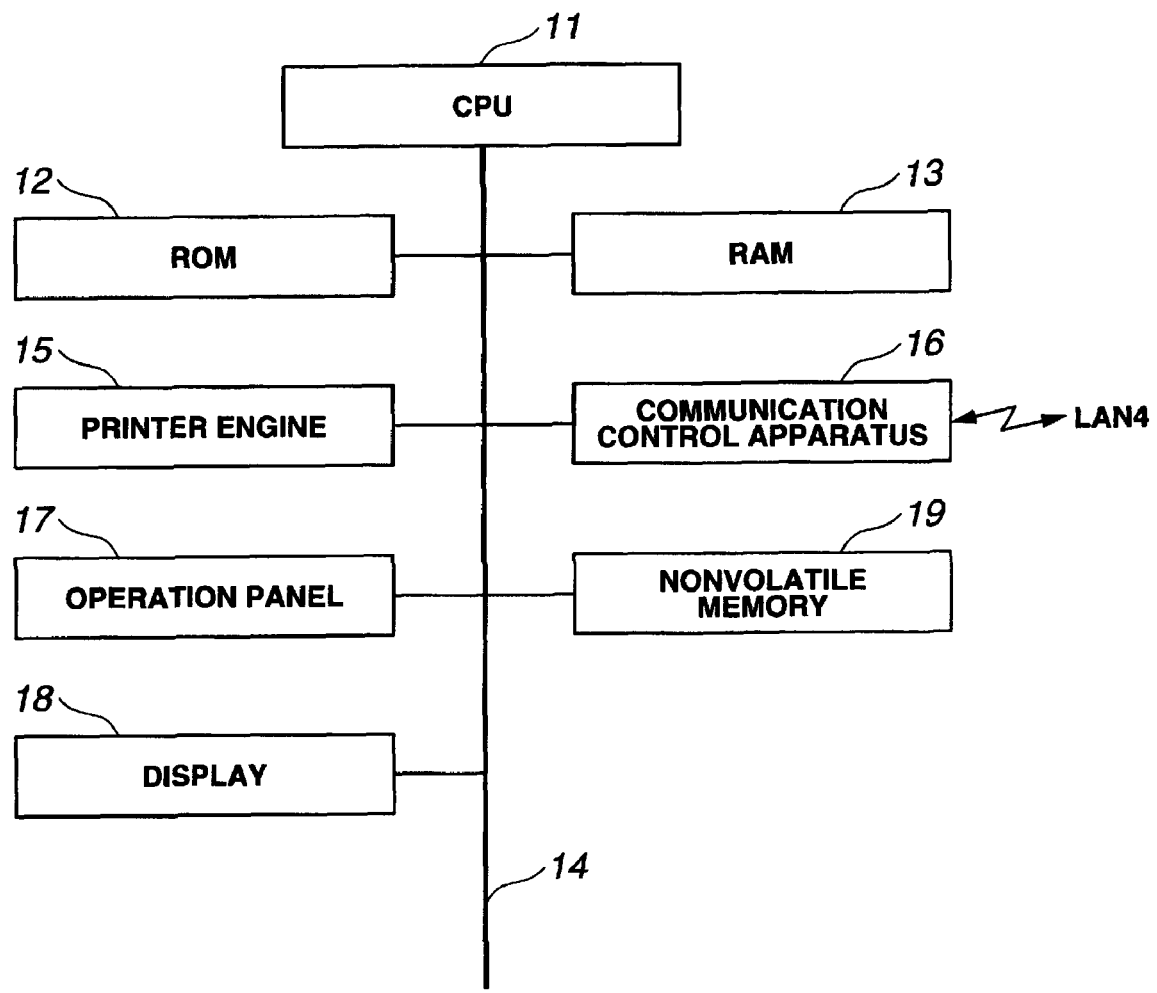
FIG. 2 is a block diagram for the electrical connection of a printer pertaining to the first example of the present invention.

FIG. 2 is a block diagram illustrating the electrical connection configuration of the printer 2. This printer 2 embodies the image formation apparatus of the present invention. In this printer 2, a CPU 11 that carries out various types of calculation, and collectively controls the respective parts, an ROM 12 that stores various types of control program to be implemented by the CPU 11 and fixed data, and an RAM 13 that provides a working area for the CPU 11 are connected through a bus 14.

To this bus 14, a printer engine 15 that carries out printing on a sheet, such as a paper, or the like, by a prescribed printing method through a prescribed interface as appropriate, a communication control apparatus 16 that carries out communication to another printer 2 or a PC 3 through the LAN 4 providing a network, an operation panel 17 with which a user carries out various types of operation, a liquid crystal display 18 that displays various types of message, and a nonvolatile memory 19 are connected. As the printing method for the printer engine 15, various printing methods such as the electrophotography method, the ink jet method, and the like, can be applied.

Hereinbelow, as a unit which embodies the image formation apparatus of the present invention, the printer is used as an example for description. However, the image formation apparatus of the present invention may be adapted to be a digital copying machine, or the like, for embodiment.

Figures 3, 4:
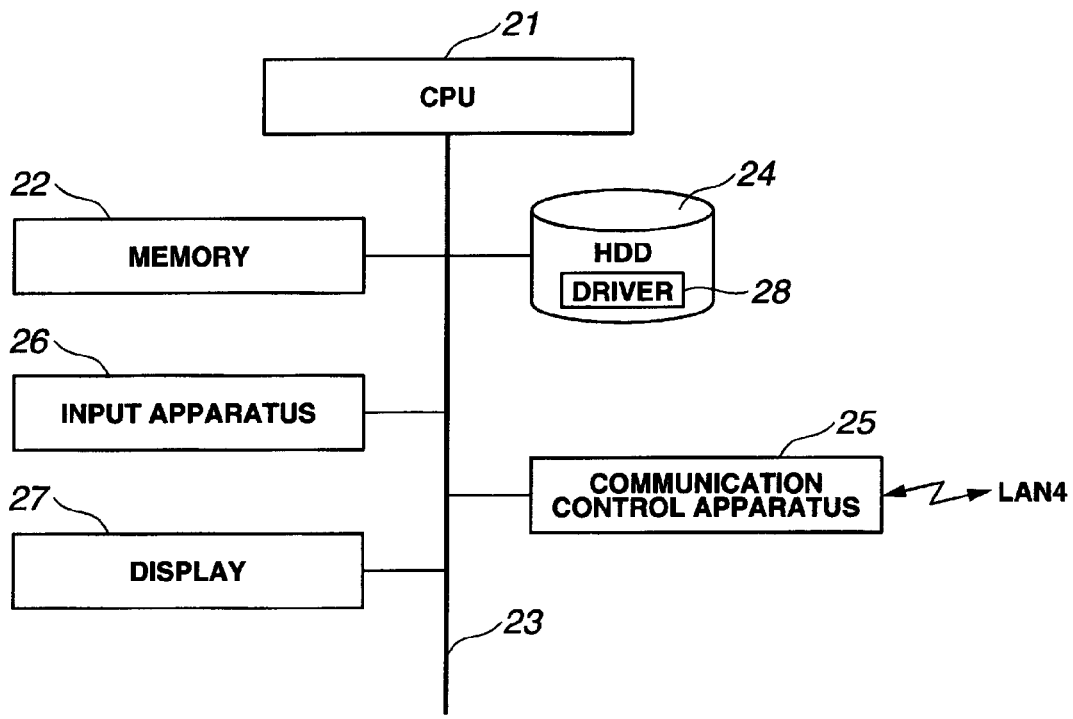
FIG. 3 is a block diagram for the electrical connection of a personal computer pertaining the first example of the present invention.
FIG. 4 is an explanatory drawing for a network address table.

FIG. 3 is a block diagram illustrating the electrical connection configuration of the PC 3. In the PC 3, a CPU 21 which carries out various types of calculation and collectively controls the respective parts, and a memory 22 made up of various types of ROM and RAM are connected through a bus 23.

To this bus 23, a magnetic storage apparatus 24, a communication control apparatus 25 which carries out communication with a printer 2 or another PC 3 through the LAN 4, an input apparatus 26 including a mouse and a keyboard, a display 27, such as an LCD, or the like, are connected through a prescribed interface as appropriate.

In the magnetic storage apparatus 24, a printer driver 28, which is an application program being run on a prescribed OS, is set up. With the printer driver 28, the PC 3 is capable of outputting a printing job to the printer 2, carrying out various types of setting of the printer 2, and in addition, receiving various commands from the printer 2.

FIG. 4 is a figure illustrating a network address table stored in a nonvolatile memory 19 in the printer 2, and therein, network addresses for identifying the printer 2 as the communication destination existing on the network are registered.

As the network address, for example, the IP (Internet Protocol) address and the MAC (Media Access Control) address are available. And in FIG. 4, examples of MAC address are given.

The network address table as shown in FIG. 4 gives an example of table stored in the nonvolatile memory 19 in the printer 2-3 as shown in FIG. 1, indicating that the MAC address of the printer 2-1, printer 2-2 existing on the LAN 4 is "XX:XX:XX:XX:XX:0a", "XX:XX:XX:XX:XX:0b", respectively.

Thereby, the printer 2-3 recognizes the printer 2-1 and the printer 2-2 existing on the same network.

(Outline of Processing)

The outline of the processing implemented by the printer 2 will be described next.

The printer 2 includes a user registration table as shown in FIG. 5. FIG. 5 shows restriction information indicating, for each particular user ID identifying the user, functions of the printer engine 15 in which the utilization is restricted.

Herein, the "restriction information" specifies the function that the particular user can utilize and the function that the particular user cannot utilize. As such functions, there are "color printing/black and white printing", "one-sided printing/two-sided printing", "type of pick-up cassette (in other words, restriction for usable and unusable paper sizes, and paper type)", and the like. For example, by registering the color printing for a specific user as the restriction information in the user registration table, the specific user is allowed or forbidden to perform the color printing.

Accordingly, upon receiving the printing job from a user whose user ID is registered (since the user ID is incorporated in the printing job by the printer driver 28, the user can be identified.), the printer 2 refers to the user registration table and causes the printer engine 15 to perform the printing job within the limitation for the user in the restriction information. For example, the printing job requesting the color printing from a user who is allowed to perform the color printing is allowed to be performed, but the printing job requesting the color printing from a user who is not allow to perform the color printing is cancelled.

And, when the printer 2 receives restriction information update data for updating the restriction information from a specific transmission destination, for example, an operational panel 17, which is a user interface of the printer 2, or a user having a administrator privilege, the printer 2 refers to a network address table and sends such restriction information update data to other printer 2.

On the other hand, when the printer 2 receives such restriction information updating data from another printer 2, such restriction information updating data is used to update the user registration table.

Furthermore, considering that the limitation for usable functions varies depending on the user, the printer 2 refers to the restriction information for each of the users in the user registration table, and sends an image indicating the usable function, in this example, information (command) instructing to display an icon to the PC 3 that a user is currently utilizing (for example, the PC 3 that the user is currently using can be identified, if a network address of the PC 3 that the user with a user ID is currently using is registered to the user registration table in association with the user ID while the user registration table is updated as necessary). The printer driver 28 of the PC 3 then displays on the display 27 the icon visually showing the usable functions for each of the printers 2 that the user of the PC 3 can utilize.

Figure 10:
FIG. 10 is an explanatory drawing for examples of icon to be displayed on the personal computer pertaining to the first example of the present invention.
Figure 10:
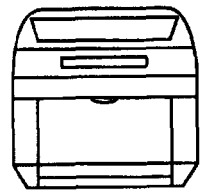
Figure 10:

For example, in FIG. 10, example icons with a shape of printer are shown, each illustrating, from left to right, that full color printing is possible, that only the gray printing is permitted, and that the plus 1 color printing is permitted.

Additionally, the icon may visually show the printing cost for processing the printing job for each particular function to be utilized.

Figure 11:
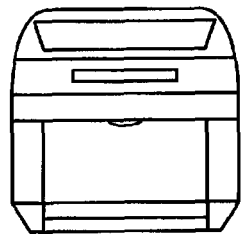
FIG. 11 is an explanatory drawing for examples of icon to be displayed on the personal computer pertaining to the first example of the present invention.
Figure 11:
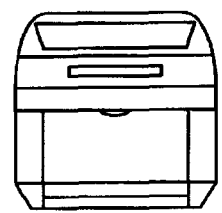
Figure 11:
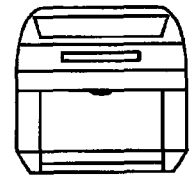

FIG. 11 provides an example where the printing cost is visually shown by the size of the icons in descending order, from the full color printing, the plus 1 color printing to the gray color printing.

As another processing example, when the limitation for the number of printing sheet is included in the restriction information, more specifically, when the number of the printing sheet is limited for each of the users, the following processing is performed.

In this case, in the user registration table (which will be described later in detail with reference to FIG. 5), a prescribed function that can be utilized in printing by the printer engine 15, for example, "restriction information", which is an upper limit for the usable number of the printing sheet, is stored for each of the user ID, which is an identifier of each user A, B and C.

Additionally, in the user register table, a "user information", which is the current value of number of the printing sheets for each of the users, is stored in association with the user ID.

Then, upon receiving a printing job from the user (since the user ID is incorporated in the printing job by the printer driver 28, the user can be identified), the printer 2 refers to the user registration table, and causes the printer engine 15 to perform the printing job within the upper limit for such user provided in the "restriction information". In other words, in an example where the number of the printing sheet is limited for each of the users, when the total number in which the number of the printing sheet requested by the printing job is added to the number of the printing sheet in the user information exceeds the upper limit for the restriction information, the printer cancels the printing job. On the other hand, when the total number does not exceeds the upper limit, the printer 2 performs the printing process.

When the printer 2 processes the printing job, the user information in the user registration table is updated in accordance with the process of the printing job. For example, in an example where the number of the printing sheet is limited, the user information is updated so as to add the number of the sheet printed by the printing job.

Then, as is the case with the above description, upon receiving the restriction information update data that updates the restriction information from a prescribed transmission destination, for example, the operation panel 17, which functions as the user interface of the printer 2, or the user having the administrator privilege, the printer 2 refers to the network address table (FIG. 4), and sends such restriction information update data to other printer 2.

Additionally, when the printer 2 receives such restriction information update data from the other printer 2, the user registration table is updated based on such restriction information update data.

Furthermore, when the printer 2 causes the printer engine 15 to perform the printing job, the printer 2 refers to the network address table (FIG. 4), and sends to the other printer 2 the user information update data in which the user information is updated in accordance with the process for such printing job. For example, in an example where the number of printing sheet is limited for each of the users, when the printer prints out five sheets through processing of the printing job, the printer 2 sends that information to the other printer 2.

And, upon receiving the user information update data from the other printer 2, the printer 2 updates the user registration table on the basis of such user information update data. For example, in an example where the number of the printing sheet is limited for each of the users, when the printer receives the information that five sheets are printed for a specific user, five sheets are added to the user information for the specific user in the user registration table.

Additionally, the printer 2 refers to the upper limit number of the restriction information and the current number of the user information in the user registration table, and sends an image visually indicating the current number in accordance with the upper limit number, for example, information (command) instructing to display an icon, to a PC 3 that is currently used by the user (for example, if the network address of the PC 3 that the user is currently using is registered to the user registration table in association with the user ID while the network address is updated as appropriate, PC 3 that is currently used by the user can be identified.). The printer driver 28 of the PC 3 then displays on the display 27 the icon visually showing the current number in accordance with the upper limit for each of the printers 2 to the user of such PC 3. The purpose of this display is to indicate the degree of closeness of the current number to the limit number.

Figure 12A:
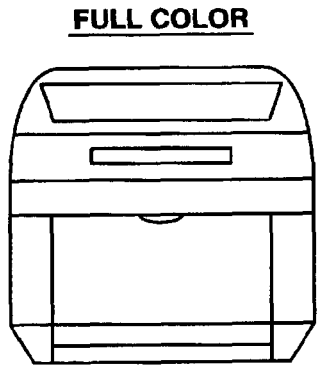
FIG. 12A and FIG. 12B are explanatory drawings for an example of icon to be displayed on the personal computer pertaining to the first example of the present invention.

Specifically, the color of the icon becomes gradually lighter as the current number approaches the upper limit number (FIG. 12A). And, the size of the icon becomes gradually smaller as the current number approaches the upper limit number (FIG. 12B), etc.

(Specific Examples of Processing)

Next, more specific examples of processing will be described with reference to flowcharts.

The present example of processing is an example in which plural printers 2 (in this example three printers 2) as a whole are enabled to unifiedly limit the number of printing sheets for each particular user. Therefore, in the nonvolatile memory 19 in the printer 2, the user registration table as shown in FIG. 5 that manages the limitation of printing for each of the users is registered. In the user registration table, the "upper limit value of number of printing sheets", which is the "restriction information", and the "current number of printing sheets", which is the "user information", are registered for each particular user ID in association with the user ID. The "upper limit value of number of printing sheets" is the upper limit value of number of sheets in which such user may print out using the respective printers 2 over the time period of one month, for example. And in this example, 50 sheets, 150 sheets, 100 sheets are set for the users A, B, and C, respectively. The "current number of printing sheets" is the total number of sheets in which such user prints out using the printers 2 from, for example, the beginning of this month up to now.

Next, the processing performed by the printer 2 will be described.

Figure 6:
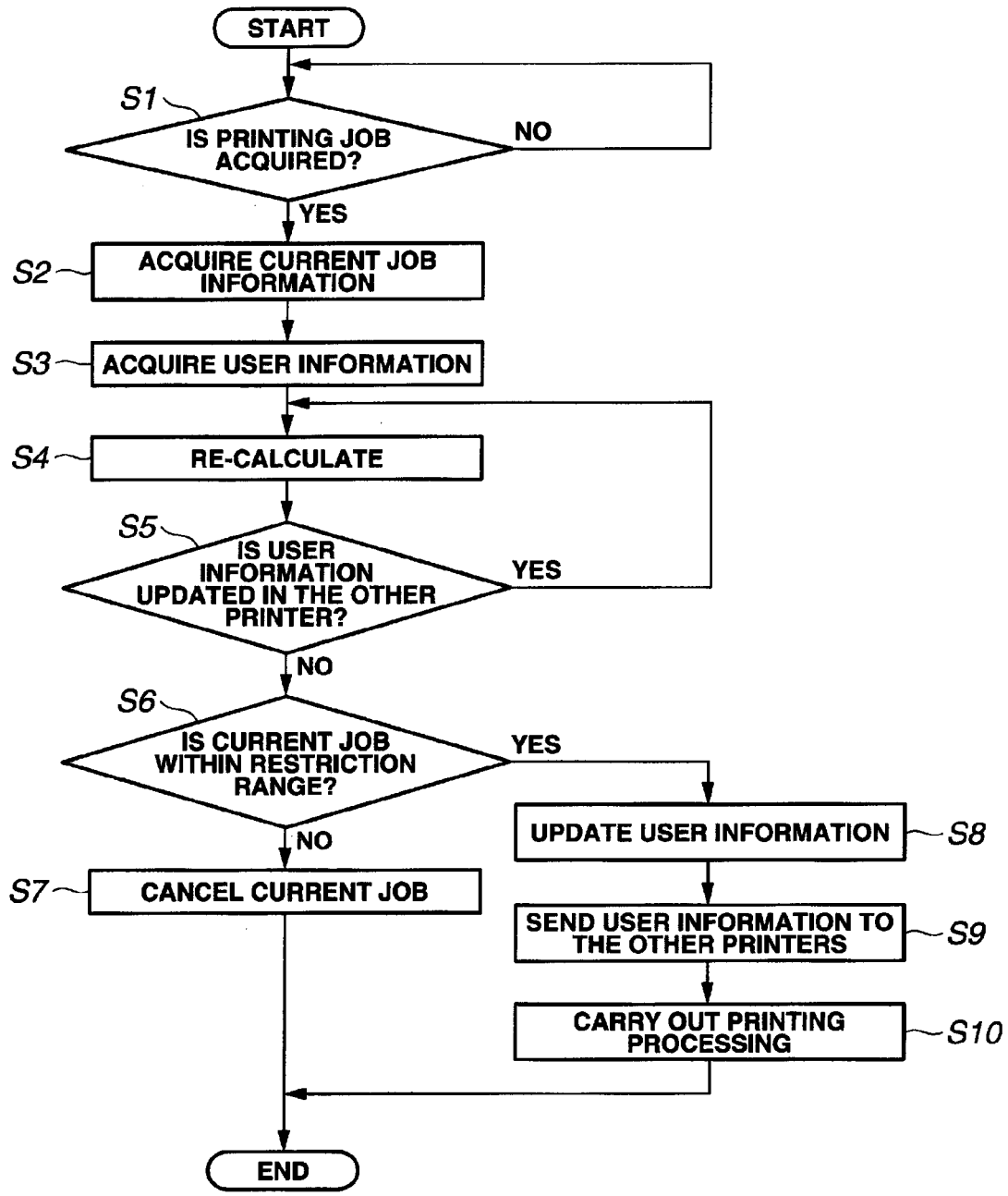
FIG. 6 is a flowchart illustrating the processing that is implemented by the printer pertaining to the first example of the present invention.

FIG. 6 is a flowchart illustrating the processing that the printer 2 performs upon reception of a printing job from a user. First, upon receiving a printing job from some user (YES in step S1), the printer 2 (the CPU 11 thereof) acquires the information (the current job information) included in that printing job (the current job) (step S2); acquires the current value of number of printing sheets, which is the user information for the user who performs this printing job, from the user registration table as shown in FIG. 5 (step S3); and re-calculates the user information (step S4). For example, when the user A performs a printing job requesting for printing of one sheet, the printer 2 extracts the current job information of this one sheet; acquires the user information, which is the current number of printing sheets of 40 sheets in the example as shown in FIG. 5; and re-calculates to obtain the user information with 41 sheets by adding newly requested one sheet to the 40 sheets.

As described later, when receiving the updated information of the user information to be registered in the user information table from other printer 2, the printer 2 stores this updated information. And, the printer 2 determines whether the other printer 2 updates the similar user information (such updated information is stored in the RAM 13) (step S5). When the other printer 2 updates the similar user information (Yes in step S5), the printer 2 again re-calculates the user information (step S4). For example, in a case where the user information is updated through the printing job performed by the user A and the updated information is stored in the RAM 13 in the other printer 2, when the other printer 2 processes the printing job of five sheets, this five sheets are added to the 41 sheets obtained as a result of the re-calculation in step S4 described above to obtain the 46 sheets.

In this way, when the user information is again re-calculated (step S4) because the user information is updated (YES in step S5), or the user information is not updated (NO in step S5), it is determined whether the current job is within the restriction range of the upper limit value of number of printing sheets in the restriction information (step S6). For example, when, by processing the current job through steps S4 and S5, the number of printing sheets for the user A becomes 46 sheets as described above, since the upper limit value of the number of printing sheets for the user A is 50 sheets, the current job is within the restriction range.

When this current job is not within the restriction range of the upper limit value of number of printing sheets (NO in step S6), the user uses up the number of printing sheets approved therefor, the current job is cancelled (step S7).

Since, when the current job is within the restriction range of the upper limit value of number of printing sheets (YES in step S6), the number of printing sheets for the user is within the range approved therefor, the current job may be permitted. Then, the user information is updated (step S8); the user information after the updating is sent to the other printers 2 (step S9); and the printing processing on the current job is implemented (step S10). For example, in the example described above, when processing the current job changes the number of printing sheets for the user A into 46 sheets, the current number of printing sheets for the user A in the user registration table is updated to 46 sheets, and the user information that the current number of printing sheets for the user A is 46 sheets is sent to the other printers 2.

Figure 7:
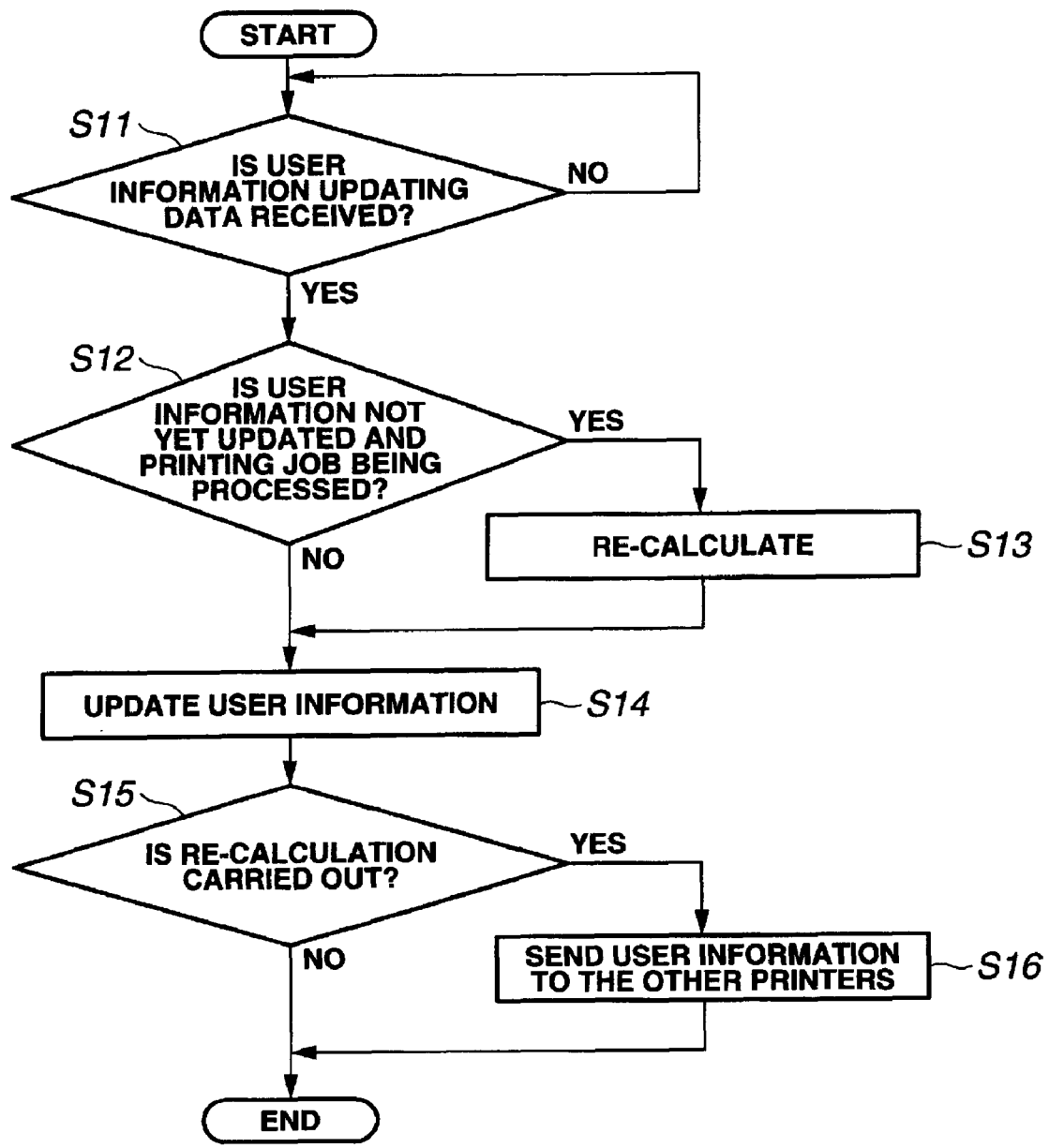
FIG. 7 is a flowchart illustrating the processing which is implemented by the printer pertaining to the first example of the present invention.

When a certain printer 2 updates the user information (step S8) and sends the user information after the updating to other printer 2 (step S9), the other printer 2 receiving the data on which the information is updated performs a process. FIG. 7 is a flowchart for the processing performed by this other printer 2.

First, when the printer 2 receives user information updating data (YES in step S11), it is determined whether the printer 2 is processing the printing job and the user information is not updated (step S12). In other words, for example, when the printer 2 receives a printing job for printing one sheet from the user A, and it is being processed, the step S12 gives a determination of YES. In this case, the user information is re-calculated (step S13). For example, in such a case when the user A has a current number of printing sheets of 40 sheets, and sends a printing job for printing one sheet, and this job is being processed, the printer 2 re-calculates by adding one sheet to the current number of printing sheets of 40 sheets.

In this way, when the printer 2 is processing the printing job, and the user information is not updated (YES in step S12), the user information is re-calculated (step S13), and otherwise (NO in step S12), the user information is updated without re-calculating the user information (step S14). Specifically, in such a case when the user A has a current number of printing sheets of 40 sheets and sends a printing job for printing one sheet, and this job is being processed, the printer 2 re-calculates by adding one sheet to the current number of printing sheets of 40 sheets. Then, if the user information updating data indicates that the user A performs printing of five sheets with other printer 2, the current number of printing sheets for the user A in the user registration table is updated with 46 sheets by adding five sheets to 41 sheets.

And, when the user information is re-calculated (step S13, YES in step S15), the user information is sent to the other printers 2 (step S16). This process is for informing the other printers 2 that the user information is changed as a result of the printing job being processed by the printer 2. For example, in the example described above, when the printer 2 receives a printing job for printing one sheet from the user A and this job is processed, the user A sends the user information indicating that printing of one sheet is executed. This user information is stored in the RAM 13 in the printer 2 as the sending destination, and whether that user information exists or not is determined at the above-described step S5.

Figure 8:
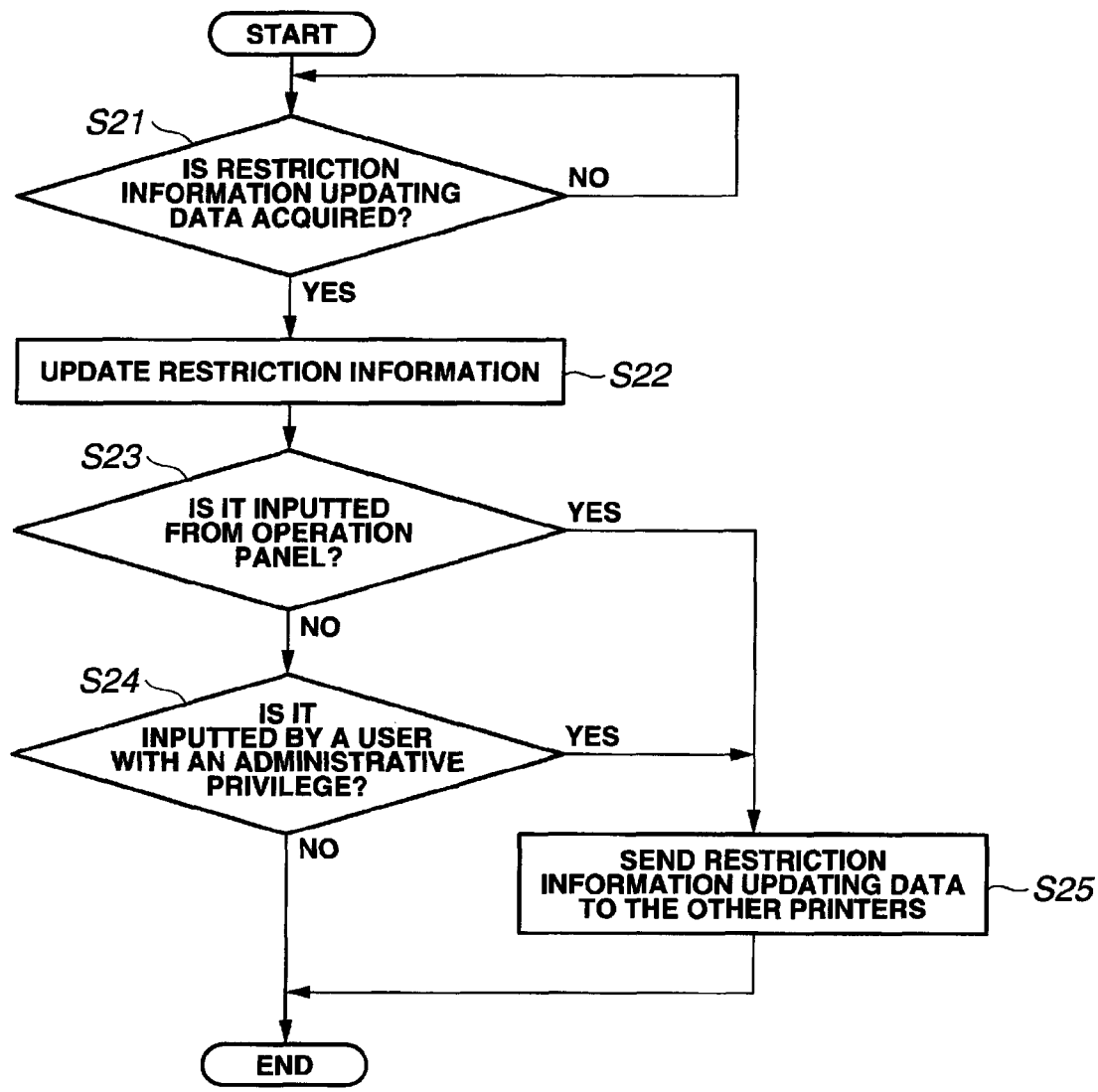
FIG. 8 is a flowchart illustrating the processing which is implemented by the printer pertaining to the first example of the present invention.

FIG. 8 is a flowchart of a process in a case when the printer 2 acquires restriction information updating data for updating the upper limit value of number of printing sheets in the restriction information.

When the printer 2 acquires the restriction information updating data (YES in step S21), this restriction information updating data is used to update the restriction information (step S22). For example, when the upper limit value of number of printing sheets for the user A is 50 sheets in the user registration table, and the printer 2 receives the restriction information updating data for changing it into 60 sheets, the upper limit value of number of printing sheets for the user A in the user registration table is updated to 60 sheets.

And, in a case where the restriction information updating data is inputted from the operation panel 17, which provides the user interface for the printer 2 (YES in step S23), or in a case where it is inputted by a user having an administrative privilege (YES in step S24), the restriction information updating data is also sent to the other printers 2 (step S25). Accordingly, the printer 2 that receives the transmission also updates the restriction information (step S22). When the restriction information updating data is data that is sent from another printer 2 (NO in step S23, NO in step 24), there is no need for notification to the other printers 2, thus the processing in step S25 will not be implemented.

Figure 9:
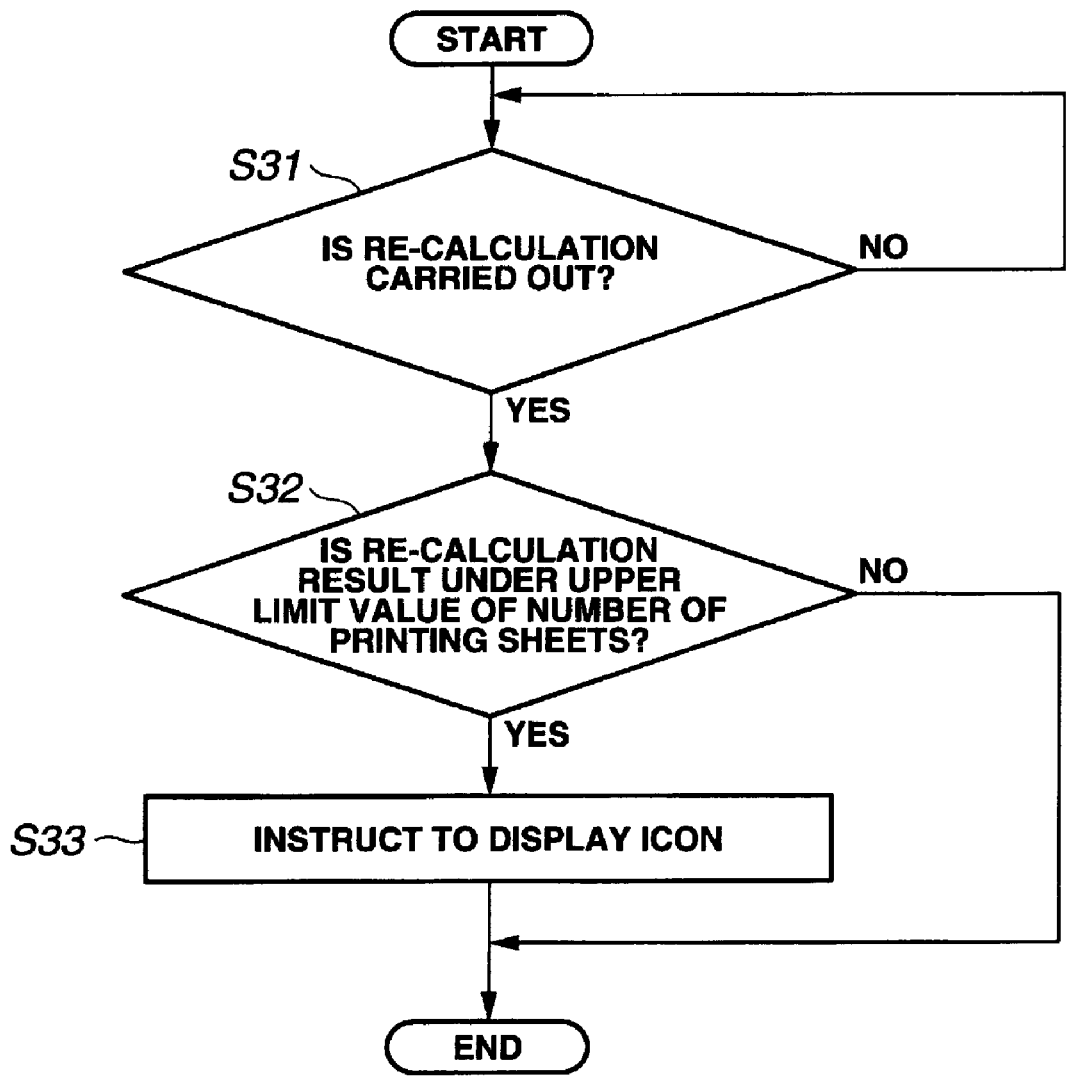
FIG. 9 is a flowchart illustrating the processing which is implemented by the printer pertaining to the first example of the present invention.

FIG. 9 is a flowchart of a process that is implemented by the printer 2 when the user information is re-calculated (step S4) in the above-stated processing in FIG. 6.

In other words, when the user information is re-calculated (step S4) in the processing in FIG. 6 (YES in step S31) and the result of the re-calculation is under the upper limit value of number of printing sheets in the restriction information (YES in step S32), a command is sent to the PC 3 currently utilized by the user who outputs the printing job, for instructing it to display the numerical value as a result of the re-calculation, in other words, an image (in this example, an icon) that varies depending upon the current number of printing sheets to the upper limit value of number of printing sheets (step S33). Thereby, the PC 3 displays the icon as specified on the display 27 on the basis of the printer driver 28.

Figure 12B:
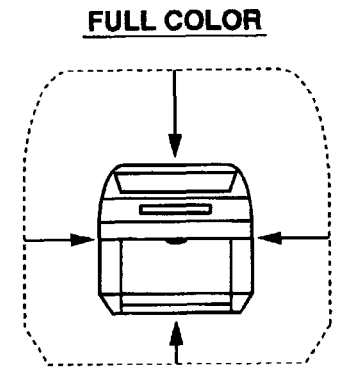

FIG. 12A shows an example of the icon in this case, which can inform the user that the upper limit value of number of printing sheets is being approached, by gradually thinning the color thereof as the current number of printing sheets approaches the upper limit value of number of printing sheets. In addition, FIG. 12B illustrates an icon of which size is gradually decreased as the current number of printing sheets approaches the upper limit value of number of printing sheets. Besides these, various techniques which visually inform the user that the upper limit value of number of printing sheets is being approached can be considered.

SECOND EXAMPLE

Another example will be described next.

The Second Example is an example for limiting the number of printing sheet for each of the users. In this example, in a case where a user tries to print exceeding its own limit number of printing sheets, and there is a margin in other users for the number of printing sheets to be printed, the printing requested by the user can be performed using the margin while the entire limit number for the group including plural users is maintained.

In the Second Example, the hardware configuration and so on of the network system 1 are the same as those in the First Example of the invention, thus the same signs and numerals will be used while a detailed description is omitted. Additionally, the network address table is the same as that in FIG. 4, thus a detailed description is also omitted.

FIG. 13 is an explanatory drawing of the user registration table stored in the nonvolatile memory 19 in the Second Example. In this user registration table, an upper limit value of number of printing sheets, which is restriction information, and a current number of printing sheets, which is user information, are registered for each user ID of a user. In the Second Example, users A, B, C form a group. And in addition to the upper limit value of number of printing sheets for each of the users, a "total restriction value", which is an total upper limit value of printing sheets for all of the users A, B, C, is also registered. The total restriction value is equal to the total value of the upper limit values of number of printing sheets for each of the users A, B, C. Additionally, each of the upper limit value of number of printing sheets, which is the restriction information, and the current value of number of printing sheets, which is the user information, is, for example, restriction value for a specific one month. In the printer 2, a "user history" indicating an average value of printing performed in each month in the recent one year, which is obtained from a log of a printing job, for example, in the recent one year for each of the users, is registered in the user registration table.

In the example shown in FIG. 13, the upper limit value of number of printing sheets for the user A is 50 sheets, the current value of number of printing sheets for the same is 45 sheets, and the user history for the same is 50 sheets. And, the total restriction value for the users A, B, and C as a whole is 300 sheets.

Figure 14:
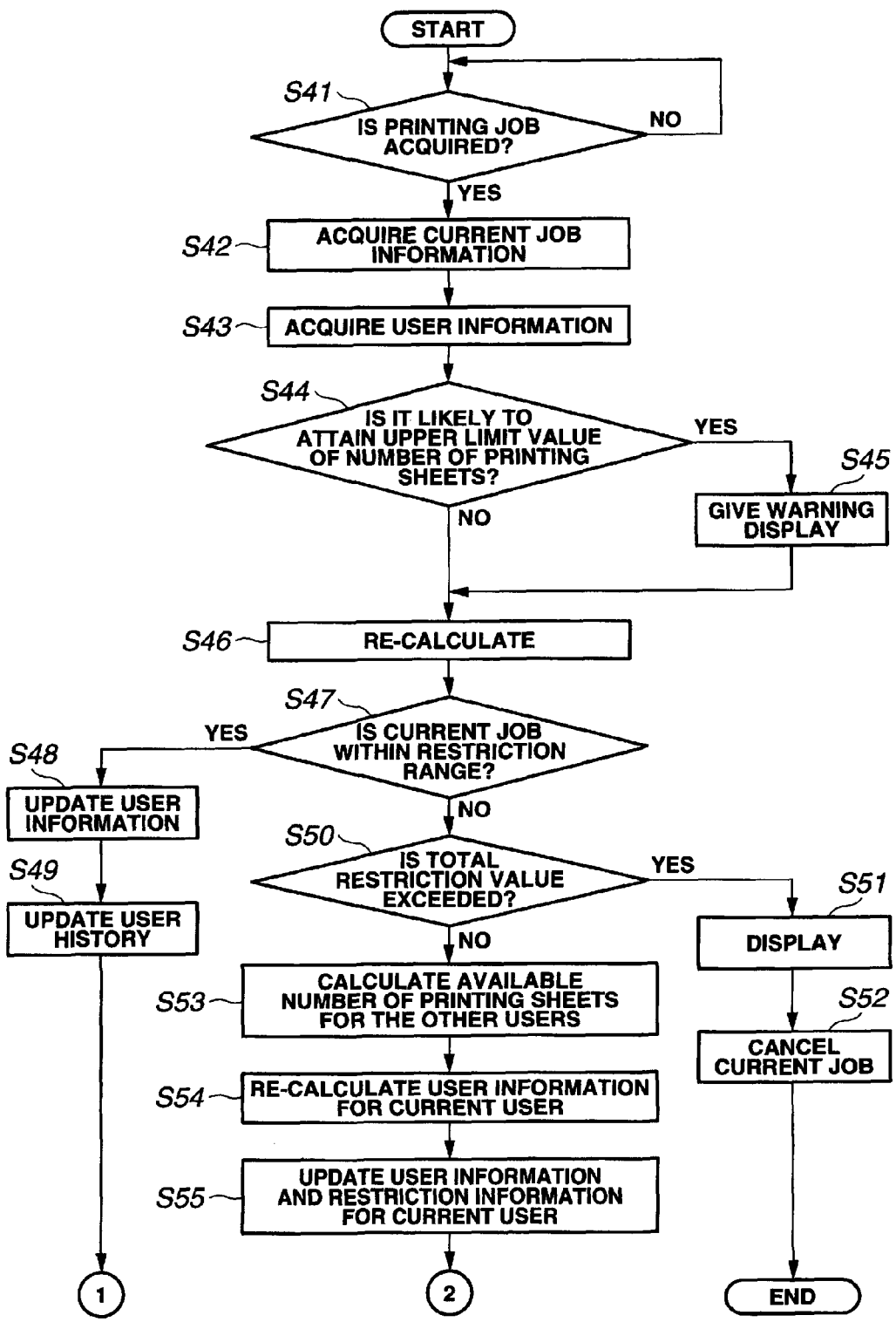
FIG. 14 is a flowchart illustrating the processing which is implemented by a printer pertaining to the second example of the present invention.
Figure 15:
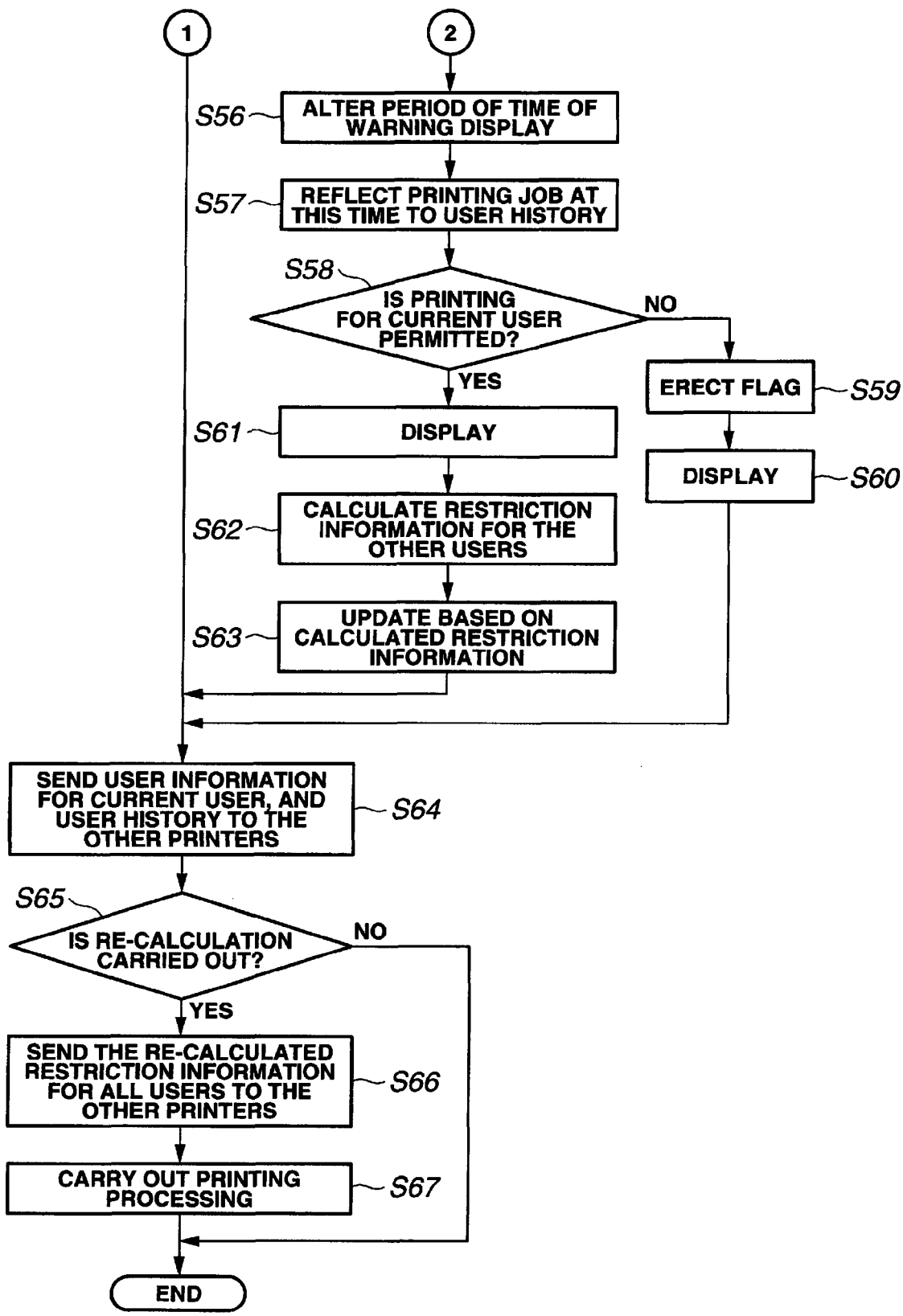
FIG. 15 is a flowchart illustrating the processing which is implemented by the printer pertaining to the second example of the present invention.

FIG. 14 and FIG. 15 are flowcharts illustrating the processing which is implemented by the printer 2 upon reception of a printing job from a user. First, when the printing job is acquired from the user (YES in step S41), the information (the current job information) included in the printing job (the current job) is acquired (step S42); the current number of printing sheets, which is the user information for the user who performs the printing job, is acquired from the user registration table as shown in FIG. 13 (step S43); and it is determined from the user history whether, after execution of the current job, it can be estimated to attain the upper limit value of number of printing sheets in the restriction information within a prescribed period of time can be estimated (step S44).

For example, assuming that the user A requests the printer 2 to execute a printing job of three sheets on the 15th day of a certain month when the current value of number of printing sheets therefor is 45 sheets, "48*30/15=96>50" is given. And from this trend, the upper limit value of number of printing sheets of 50 sheets will be exceeded up to the end of the month. Thus, it can be estimated from the user history information that, after the execution of the current job, the upper limit value in the restriction information is attained within a prescribed period of time (YES in step S44).

In this way, when it can be estimated from the user history information that, after the execution of the current job, the upper limit value in the restriction information is attained within a prescribed period of time (YES in step S44), a command is sent to the PC 3 which is currently utilized by the user, for causing the display 27 to show a warning display (step S45). This is for causing the user to refrain from excessive printing.

Then, the current job information is re-calculated (step S46). When the current job is within the restriction range of the upper limit value of number of printing sheets, which is the restriction information for the user (YES in step S47), the current value of number of printing sheets, which is the user information for the user, is updated in the user registration table (step S48). Additionally, in the user registration table, the user history for the user is also updated (step S49). Such updating of the user history is carried out, because processing of the printing job received in step S41 causes the average value of the actual results of printing for each of the months in the last one year to be changed.

When the value of the current job exceeds the restriction range of the upper limit value of number of printing sheets, which is the restriction information for the user (NO in step S47), it is determined whether the result of adding the number of sheets for the current job at this time to the total actual result based on the user history for the grouped users A, B, and C as a whole exceeds the total restriction value (step S50). For example, in the example in FIG. 13, from the user history for the users A, B, and C as a whole, the trend is such that printing of 270 sheets per month is executed by three persons in total. Even if, to this, the printing job of 5 sheets at this time is added, the value of 300 sheets will not be exceeded, thus the step S50 gives a determination of NO.

When a determination of YES is given at the step S50, it means that the total restriction value for the grouped users as a whole is exceeded, thus a command is sent to the PC 3 which is being currently utilized by the user, for causing the display 27 to indicate the excess (step S51). And, the execution of the current job is cancelled (step S52).

When the step S50 gives a determination of NO, it means that, if the current job is processed, the total restriction value for the grouped users as a whole will not be exceeded, thus on the basis of the user history of each of the users, the restriction information for each of the users is re-allocated.

First, based on the user history of other users, the number of printing sheets available to print is obtained from the number of printing sheets in which each of the other users can print out (Step S53). For example, when the user A requests the printing job of five sheets under the condition where the upper limit value of number of printing sheets for the user A is 50 sheets and the current value of number of printing sheets for the user A is 48 sheets, three sheets are exceeded from the upper limit value of number of printing sheets for the user A. Assuming that the upper limit values of number of printing sheets for the other users B and C are 150 sheets with the user history of 130 sheets and 100 sheets with the user history of 90 sheets, respectively, the margins for the users B and C, which are estimated based on the past trend of the users B and C, are 20 sheets and 10 sheets, respectively. Since the ratio is 2:1, it is considered that the exceeded three sheets can be supplied two sheets from the user B, and one sheet from the user C. Otherwise, considering "1-130/150:1-90/100≈13: 10", the exceeded three sheets can be supplied two sheets from the user B and one sheet from the user C.

In this way, after the numbers of printing sheets to be allotted to the other users are determined (step S53), the user information for the current user is re-calculated (step S54). In this example, the current value of number of printing sheets for the user A is 48 sheets, and 5 sheets are to be printed, thus the result of the re-calculation will be 53 sheets. Additionally, the user information and the restriction information for the current user are updated (step S55). In this example, the user information and the restriction information for the user A in the user registration table will be updated to 53 sheets, respectively.

In this case, the original upper limit value of number of printing sheets for the user is exceeded. Thus, the time period for displaying the above-described warning display (step S45) is altered (step S56). This makes it possible for the user to more carefully consider whether the subsequent printing is to be executed or not. And, the printing job at this time is reflected to the user history for the current user (step S57).

And, it is determined whether the printing for the current user in the future (during this month) is permitted (step S58). Such determination can be made based on the trend of the actual result of the user on the number of printing sheets in the past; for example, when the re-allocation as described above is successively carried out for the user over three months, permission is not given, and otherwise, it is given.

When the printing for the current user is rejected (NO in step S58), a flag indicating that the subsequent printing job for the current user is rejected is erected (step S59). Thereby, a command indicating that the subsequent printing job for the user is rejected is outputted to the PC 3 which is currently utilized by the user (step S60), and the display 27 is caused to indicate the rejection.

Additionally, when the printing for the current user is permitted (YES in step S58), a command for causing the display 27 to indicate the permission is outputted to the PC 3 which is currently utilized by the user (step S61). And, an upper limit value of number of printing sheets, which provides new restriction information, is calculated for the users other than the current user (step S62). In the above-described example, two sheets for the user B, and one sheet for the user C have been provided for the user A. Thus, the upper limit value of number of printing sheets for the user B is changed from 150 sheets to 148 sheets, while the upper limit value of number of printing sheets for the user C is changed from 100 sheets to 99 sheets. And, with these calculated upper limit values of number of printing sheets in the restriction information, the user registration table is updated (step S63).

After the above-stated processing is implemented, the current value of number of printing sheets, which is the user information for the current user, and the user history are sent to the other printers 2 with reference to the network addresses (step S64). In the above-described example, the user information after the update, which indicating that the current value of number of printing sheets for the user A is 53 sheets, and the user history after the updating, are sent. The processing implemented by the other printers 2 when this user information is received will be described later with reference to FIG. 16, while the processing implemented by the other printers 2 when the user history is received will be described later with reference to FIG. 18.

And, it is determined whether the restriction information for each of the grouped users including the current user is re-calculated (step S65). When the step S63 is implemented, such re-calculation is carried out (YES in step S65). Thus, the re-calculated restriction information for all the users is sent to the other printers 2 (step S66). In the above-described example, the information of 53 sheets, 148 sheets, and 99 sheets, which are the upper limit values of number of printing sheets after the updating for the users A, B, and C, respectively, is sent. The processing of the printer 2 when this restriction information is received will be described later with reference to FIG. 17.

After the above-stated processing is implemented, the printing processing by the printer engine 15 is performed (step S67).

Figure 16:
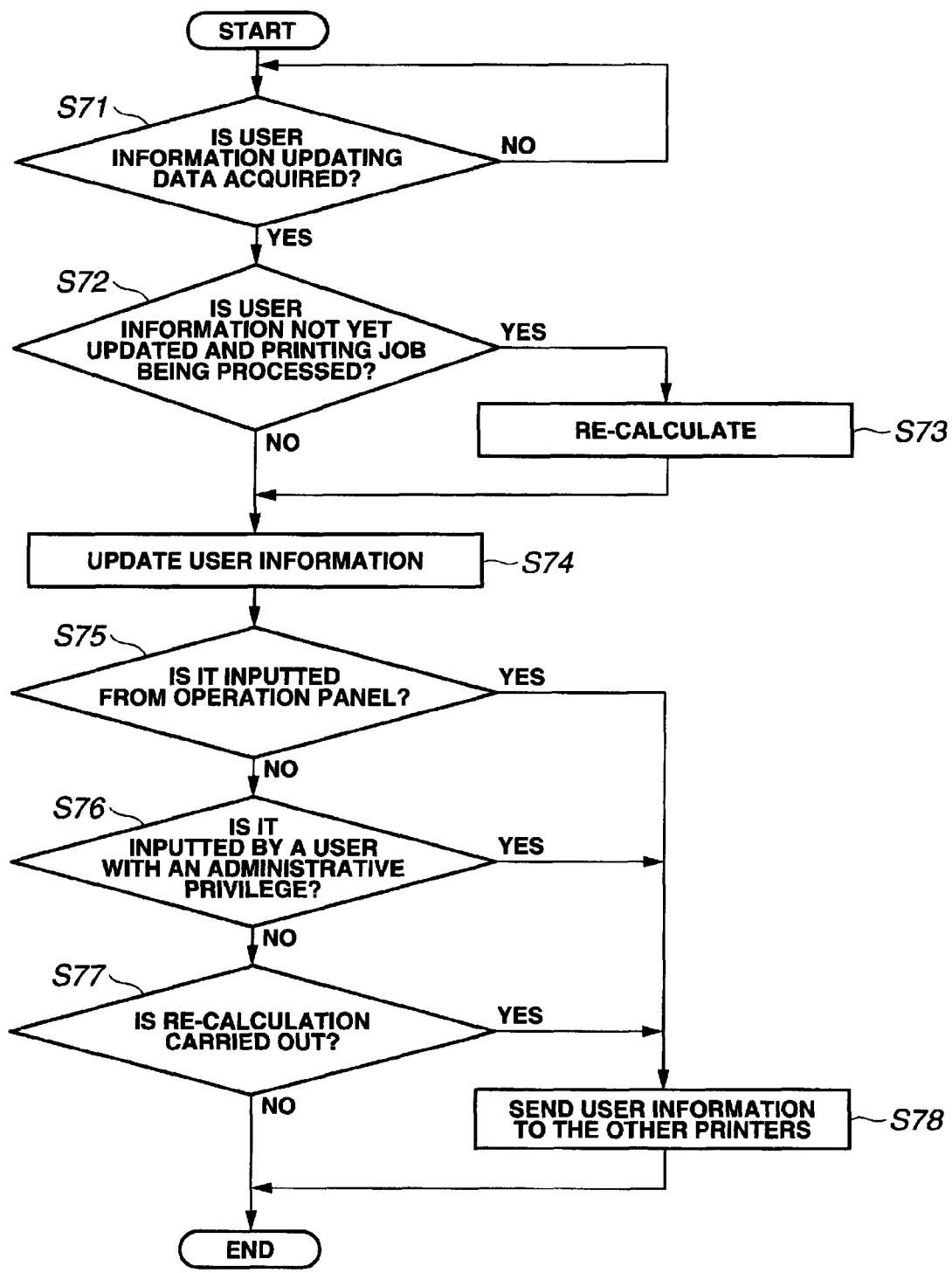
FIG. 16 is a flowchart illustrating the processing which is implemented by the printer pertaining to the second example of the present invention.

FIG. 16 is a flowchart illustrating the processing which is implemented by the printer 2 when a certain printer 2 acquires user information updating data.

First, when the printer 2 acquires user information updating data (YES in step S71), it is determined whether the user information is not yet updated, while the printer 2 is in the process of the printing job (step S72). In other words, for example, when a printing job for printing out one sheet is received from the user A, and it is being processed, the step S72 gives a determination of YES. In this case, the user information is re-calculated (step S73). For example, in such a case when the user A has a current number of printing sheets of 40 sheets, and sends a printing job for printing out one sheet, and this job is being processed, re-calculation for adding one sheet to the current number of printing sheets of 40 sheets is carried out.

In this way, when the printer 2 is in the process of the printing job and the user information is not yet updated (YES in step S72), the user information is re-calculated (step S73). Otherwise (NO in step S72), the user information is updated without re-calculating the user information (step S74). For example, in such a case when the user A has a current number of printing sheets of 40 sheets and sends a printing job for printing out one sheet, and this job is being processed, re-calculation for adding one sheet to the current number of printing sheets of 40 sheets is carried out. Then, if the user information updating data indicates that the user A prints out 5 sheets with another printer 2, the current number of printing sheets for the user A in the user registration table is updated with 46 sheets as a result of adding 5 sheets to 41 sheets.

And, in the case where the user information updating data is inputted from the operation panel 17, which provides the user interface for the printer 2 (YES in step S75), or in the case where it is inputted by a user having an administrative privilege (YES in step S76), or, when user information is re-calculated (step S73, YES in step S77), the user information is sent to the other printers 2 (step S78). This is for informing the other printers 2 of the user information that is changed as a result of the printing job being processed with the printer 2.

Figure 17:
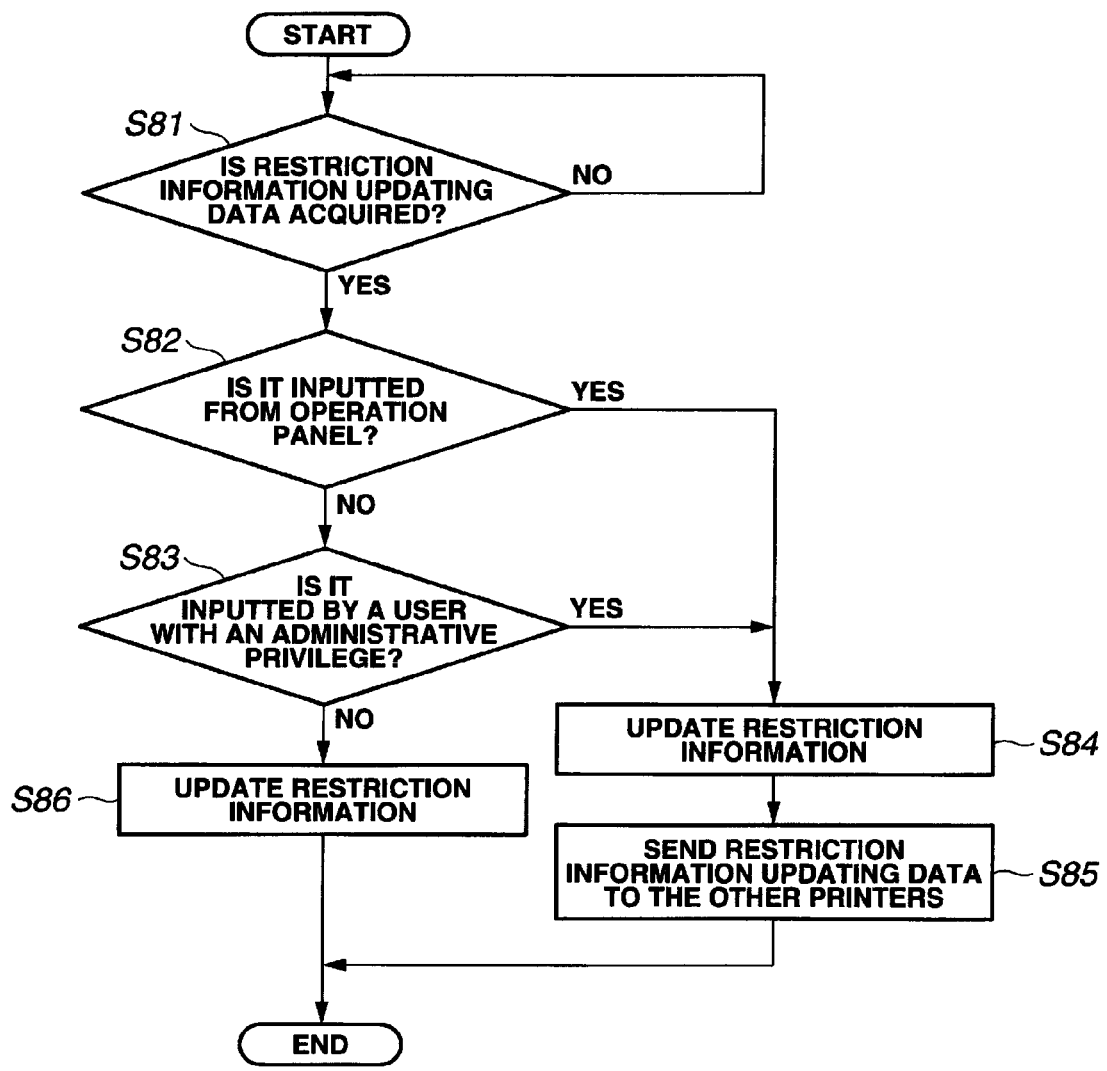
FIG. 17 is a flowchart illustrating the processing which is implemented by the printer pertaining to the second example of the present invention.

FIG. 17 is a flowchart illustrating the processing which is implemented when the printer 2 acquires restriction information updating data for updating the upper limit value of number of printing sheets in the restriction information.

In other words, when the printer 2 acquires restriction information updating data (YES in step S81), and in the case where the restriction information updating data is inputted from the operation panel 17, which provides the user interface for the printer 2, (YES in step S82), or in the case where it is inputted by a user having an administrative privilege (YES in step S83), the restriction information in the user registration table is updated with the restriction information updating data (step S84), and the restriction information updating data is sent to the other printers 2 (step S85). This is for informing the other printer 2 that the restriction information is changed. When this restriction information is acquired from another printer 2 (NO in step S83), the restriction information in the user registration table is updated with the restriction information updating data (step S86).

Figure 18:
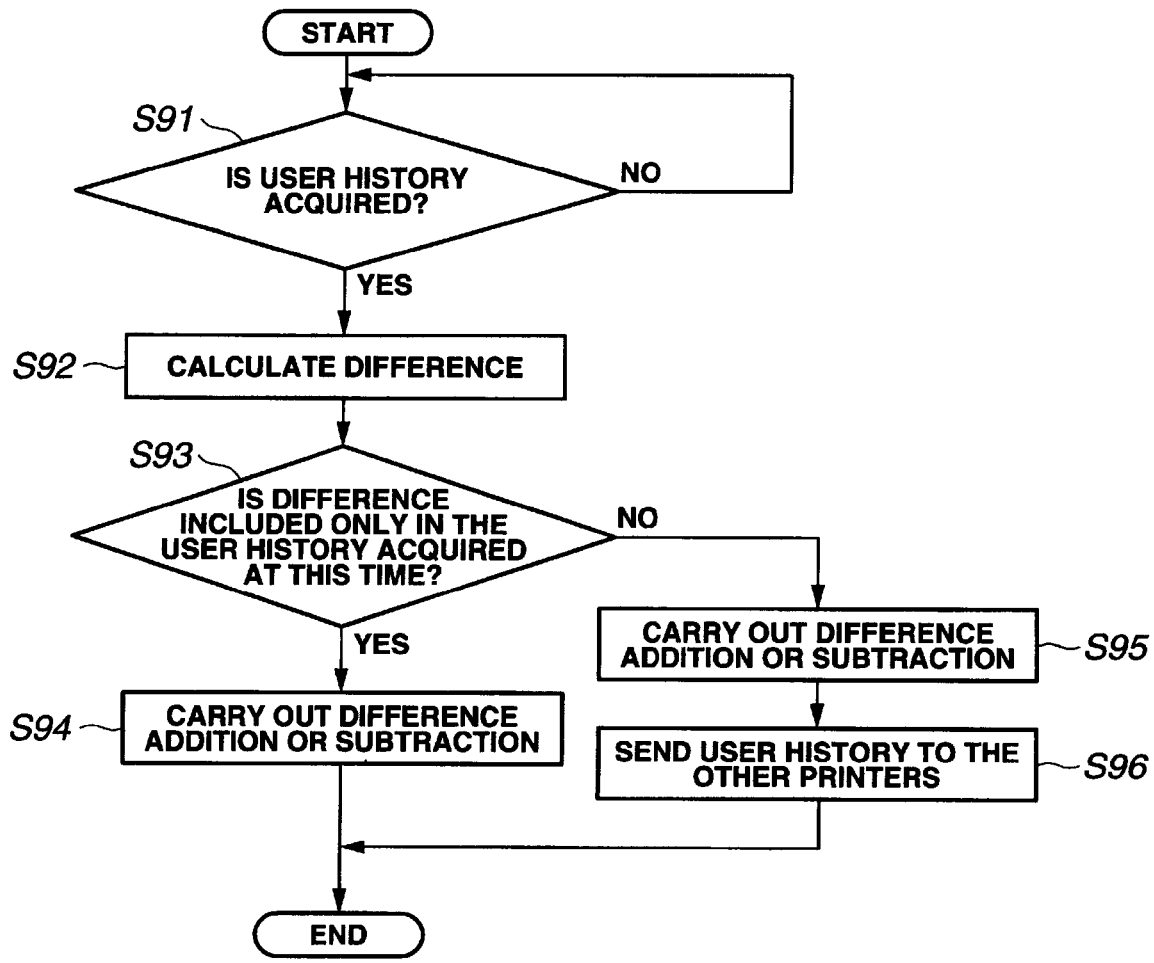
FIG. 18 is a flowchart illustrating the processing which is implemented by the printer pertaining to the second example of the present invention.

FIG. 18 is a flowchart illustrating the processing which is implemented by the printer 2 when the printer 2 acquires a user history from another printer 2.

When the printer 2 acquires a user history from other printer 2 (YES in step S91), the difference between the user history acquired at this time and the user history held in the user registration table is calculated (step S92). And, when that difference is included only in the user history acquired at this time (YES in step S93), and is not included in the existing user history held in the user registration table, the information of the difference is added to or subtracted from the user history held in the existing user registration table (step S94).

For example, if the user history for the user A is 49 sheets, while the user history for the user A acquired at this time is 50 sheets, the 50 sheets as a result of addition of one sheet is adopted as the data to be registered in the user registration table as the user history for the user A.

Additionally, when the difference is also included in the user history held in the existing user registration table (NO in step S93), the information of the difference based on the user history acquired at this time is added to or subtracted from the user history held in the existing user registration table (step S95), and, that user history is sent to the other printers 2 (step S96). This is for informing the other printers 2 that the user history is changed as a result of the printing job being processed with the printer 2.

It should be noted that, in the Second Example, the processing as shown in FIG. 9 described above is implemented.

THIRD EXAMPLE

Another example will be described next.

As is the case with the Second Example, the Third Example is also an example in which, even if the upper limit value of number of the printing sheets for the user is exceeded, when there is a margin in the limit value of number of printing sheets for other users, the user can use the margin of the other users to print out, while the total upper limit value of number of printing sheets for all the users in the group is maintained.

However, unlike the First and Second Examples, in the Third Example, each printer 2 as a whole does not unifiedly limit the number of printing sheets for each user through synchronization of each of the printers 2. Therefore, the processing as described hereinbelow that is implemented by the printer 2 is a processing which is implemented by the individual printer 2 independently of the other printers 2.

In the Third Example, the hardware configuration, and the like, of the network system 1 are the same as those in the First Example of the invention. Thus, hereinbelow, the same signs and numerals will be used while a detailed description is omitted. Additionally, the network address table is the same as that in FIG. 4, thus a detailed description is omitted.

Figure 19:
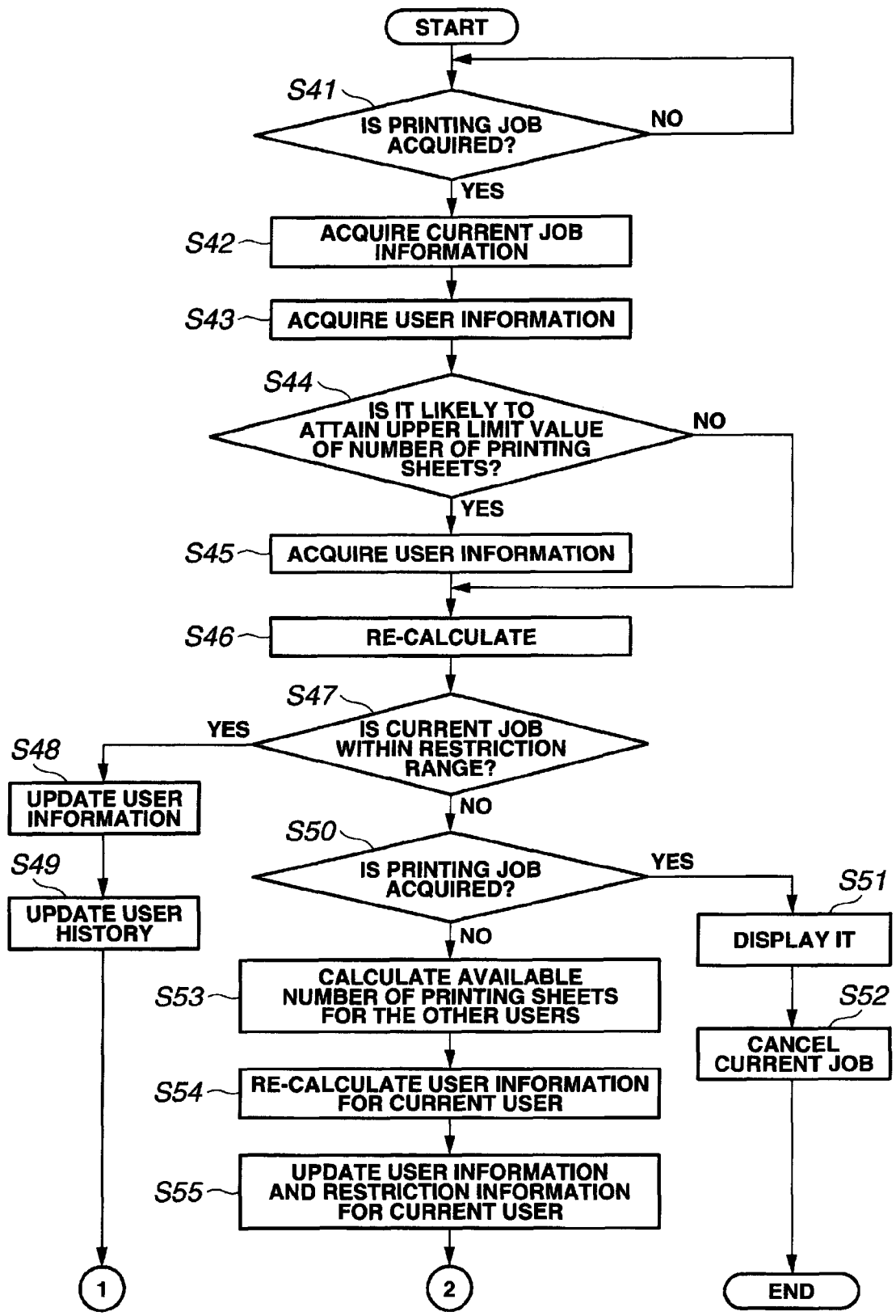
FIG. 19 is a flowchart illustrating the processing which is implemented by a printer pertaining to a third example of the present invention.
Figure 20:
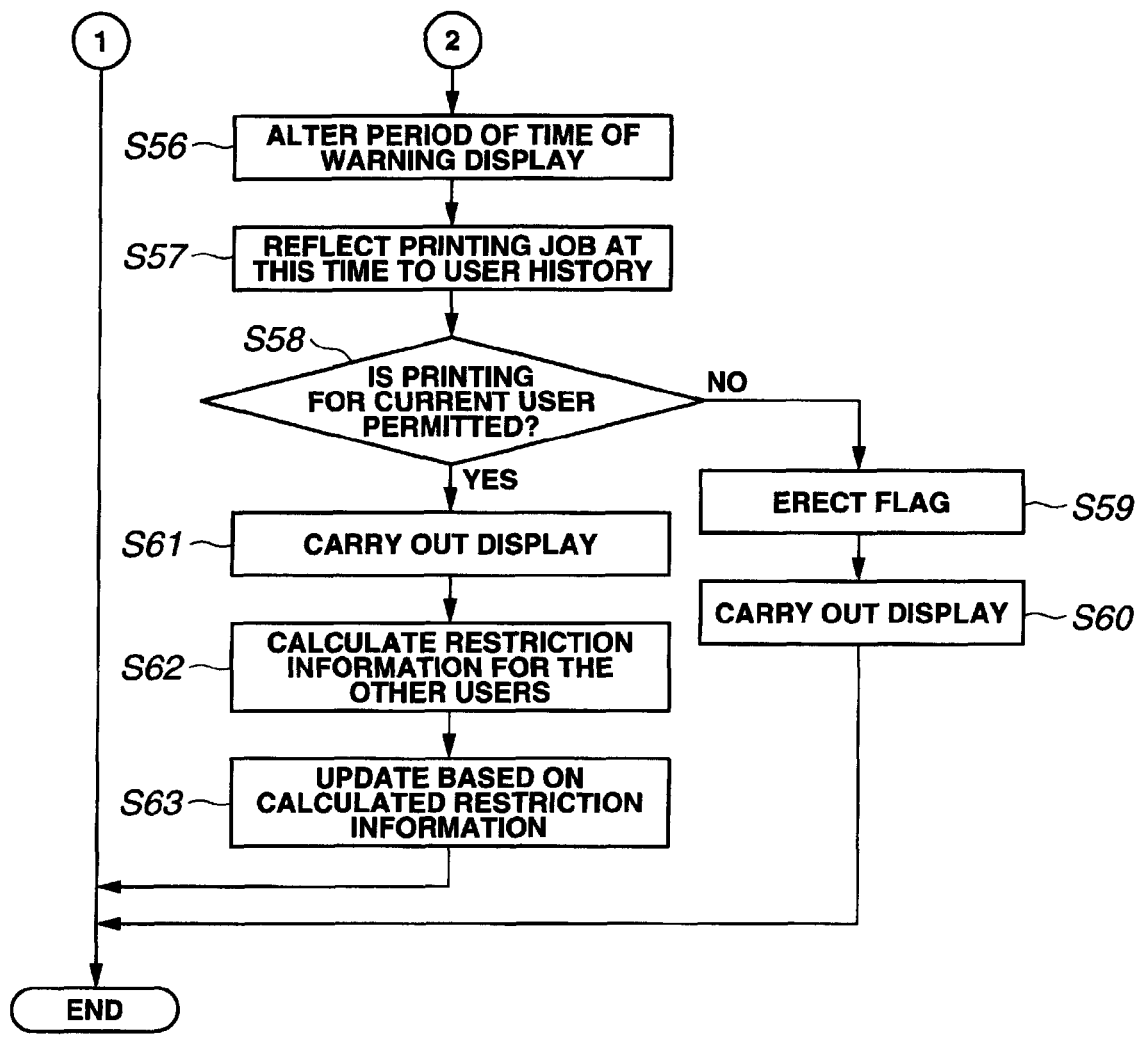
FIG. 20 is a flowchart illustrating the processing which is implemented by the printer pertaining to the third example of the present invention.

FIG. 19 and FIG. 20 are flowcharts illustrating the processing which is implemented by the printer 2 in the Third Example. In the same figure, the steps having the same signs and numerals as those in FIG. 14 and FIG. 15 are the same as those in the Second Example, thus a detailed description is omitted.

It should be noted that, in the Third Example, the processing as shown in FIG. 9 described above is implemented.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus, comprising:
    an identification information storing section that stores identification information for other printing apparatus;
    a restriction information storing section that groups the identification information stored in the identification information storing section, and stores restriction information that gives a restriction for using a function provided by a printing apparatus belonging to the same group;
    an information sharing section that mutually shares the identification information stored in the identification information storing section and the restriction information stored in the restriction information storing section with printing apparatuses in the same group;
    an information controller that, upon update of the restriction information stored in the restriction information section, controls to send the restriction information to other printing apparatus in the same group, based on the identification information mutually shared by the information sharing section;
    a usage restriction section that restricts use of the function, based on the restriction information sent from the information controller to other printing apparatus, and
    a history information storing section that stores usage history information on the utilization of the function of the printing apparatus for each user and each group to which the user belongs,
    wherein the restriction information storing section stores the restriction information for each user and group, and stores restriction information for a plurality of periods of time for each user and group,
    the usage restriction section includes:
        a checking section that, in a case of exceeding the restriction information for the user stored in the restriction information storing section, checks a usage status for each period of time based on the usage history information of the user and of other users in a same usage group as the user stored in the history information storing section; and
        a calculation section that calculates a usable restriction range for the user by using the restriction information of the user, margins of the other users, and ratios of the margins of the other users, based on the usage status of the user and of the other users checked by the checking section, and
    the user is enabled to use the function within the restriction range calculated by the calculation section,
    wherein the margins of the other users are estimated based on past trends of the other users, respectively.

2. The printing apparatus according to claim 1, wherein in a case of using the function beyond the restriction information stored in the restriction information storing section, the usage restriction section comprises a usage condition displaying section that displays a usage condition for the function within the restriction information, and
    the use of the function is restricted under the usage condition displayed by the usage condition displaying section.

3. The printing apparatus according to claim 1, further comprising:
    a usable limit checking section that checks a usable limit of the function with the restriction information stored in the restriction information storing section, and
    a visual information displaying section that displays visual information to refer to the usable limit checked by the usable limit checking section.

4. A printing method, comprising:
    storing identification information of other printing device,
    grouping the stored identification information,
    storing restriction information that gives a restriction for using a function provided by a printing apparatus belonging to the same group,
    mutually sharing the stored identification information and the stored restriction information with the other printing apparatus,
    upon update of the stored restriction information, controlling to send the restriction information to other printing apparatus, based on the mutually shared identification information,
    restricting the use of the function based on the restriction information sent to the other printing apparatus, and storing usage history information on the utilization of the function of the printing apparatus for each user and each group to which the user belongs, wherein the restriction information is stored for each user and group, and restriction information is stored for a plurality of periods of time for each user and group, the restricting the use based on the restriction information includes:
- in a case of exceeding the restriction information stored for the user, checking a usage status for each period of time based on the usage history information of the user and of other users in a same usage group as the user; and
- calculating a usable restriction range for the user by using the restriction information of the user, margins of the other users, and ratios of the margins of the other users, based on the checked usage status of the user and of the other users, and
- enabling the user to use the function within the calculated usable restriction range, wherein the margins of the other users are estimated based on past trends of the other users, respectively.

5. A non-transitory computer readable recording medium storing a printing program for causing a computer to execute a process, the process comprising:

storing identification information of other printing device, grouping the stored identification information, storing restriction information that gives a restriction for using a function provided by a printing apparatus belonging to the same group, mutually sharing the stored identification information and the stored restriction information with the other printing apparatus, upon update of the stored restriction information, controlling to send the restriction information to other printing apparatus, based on the mutually shared identification information, restricting the use of the function based on the restriction information sent to the other printing apparatus, and storing usage history information on the utilization of the function of the printing apparatus for each user and each group to which the user belongs, wherein the restriction information is stored for each user and group, and restriction information is stored for a plurality of periods of time for each user and group, the restricting the use based on the restriction information includes:
- in a case of exceeding the restriction information stored for the user, checking a usage status for each period of time based on the usage history information of the user and of other users in a same usage group as the user; and
- calculating a usable restriction range for the user by using the restriction information of the user, margins of the other users, and ratios of the margins of the other users, based on the checked usage status of the user and of the other users, and
- enabling the user to use the function within the calculated usable restriction range, wherein the margins of the other users are estimated based on past trends of the other users, respectively.

\* \* \* \* \*